Dec. 27, 1949  J. A. BAKER  2,492,829
AUTOMOBILE TRANSPORTING TRAILER
Filed Nov. 22, 1946  2 Sheets-Sheet 2
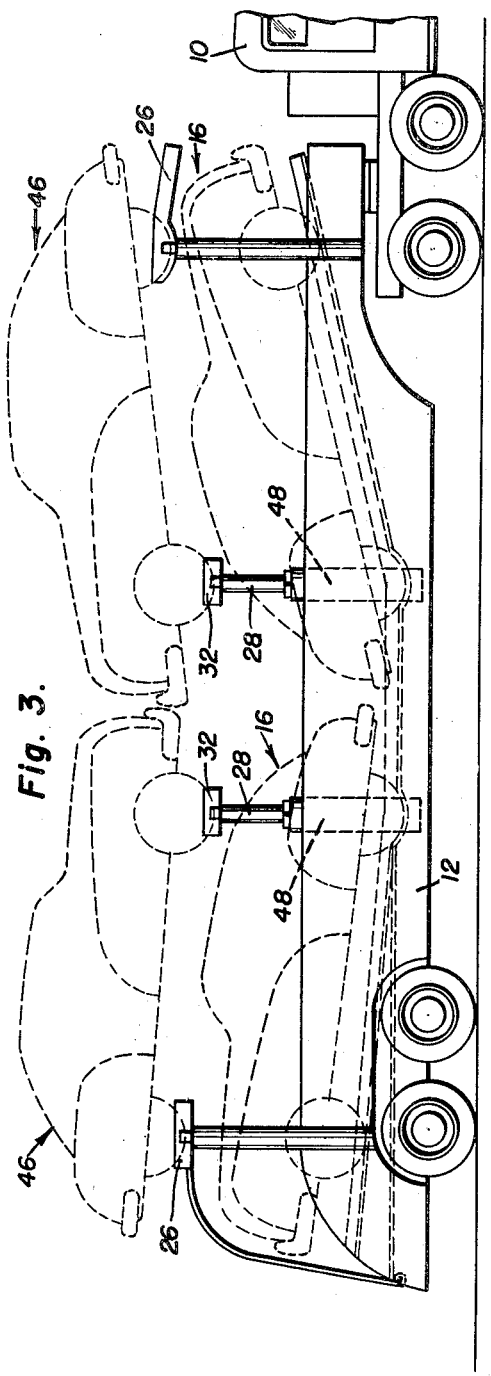
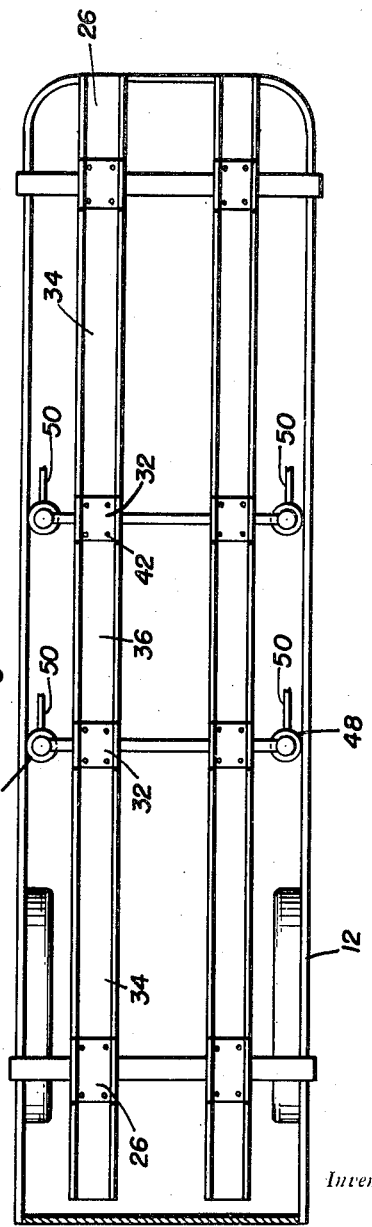
Inventor
Joseph A. Baker
By *Clarence A. O'Brien and Harvey B. Jacobson*
Attorneys Patented Dec. 27, 1949

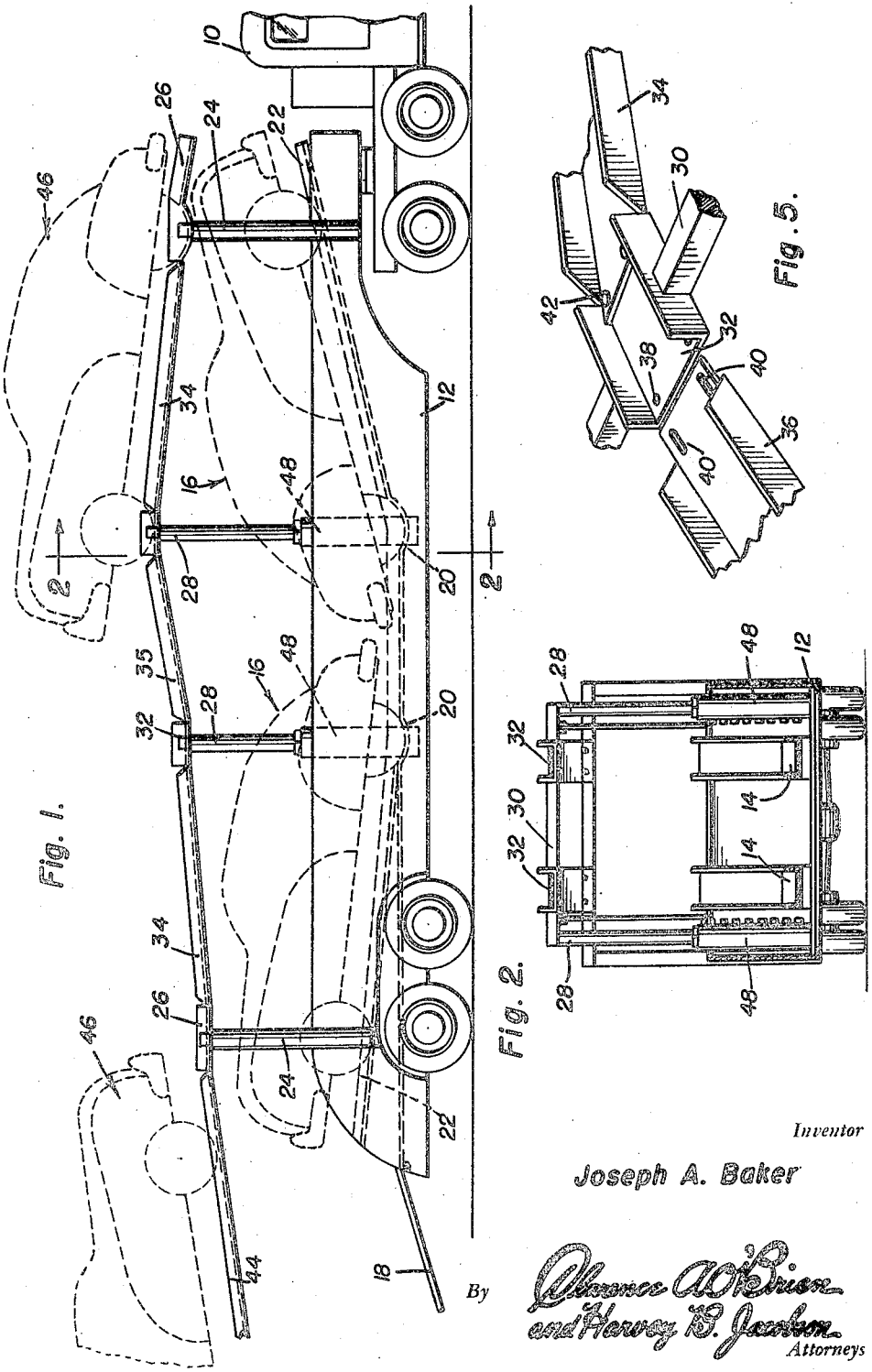

2,492,829

UNITED STATES PATENT OFFICE 2,492,829

AUTOMOBILE TRANSPORTING TRAILER

Joseph A. Baker, Detroit, Mich.

Application November 22, 1946, Serial No. 711,760

2 Claims. (Cl. 296—1)

1

The present invention relates to novel and useful improvements in an apparatus and method for transporting automobiles, and more specifically pertains to a more compact means and method for storing automobiles upon a trailer for reducing the necessary clearance therebetween during transportation of the same.

The principal objects of this invention reside in providing a method and an apparatus for supporting a second layer or pair of automobiles upon a trailer above the first pair of cars; for reducing the necessary clearance customarily provided between the two layers of cars; for providing an advantageous and easily assembled and disassembled means for loading the second layer of cars above the first layer of cars; and for providing a means for lowering the individual automobiles in the second layer into close proximity and snug interfitting and nestled relation with the lower layer of vehicles.

These, together with various ancillary objects of the invention which will later become apparent as the following description proceeds, are realized by this invention, one embodiment of which has been illustrated by way of example only in the accompanying drawings, wherein:

Figure 1 is an elevational view showing the novel apparatus with a first layer of cars positioned thereon and a second layer of automobiles being loaded thereon;

Figure 2 is a transverse vertical sectional view through the apparatus shown in Figure 1, taken substantially upon the section line 2—2 of Figure 1;

Figure 3 is a view similar to Figure 1, but showing the second layer of automobiles in fully loaded position upon the trailer;

Figure 4 is a top plan view showing the upper loading tracks or platform of the device; and Figure 5 is a fragmentary detailed view, taken in perspective, and illustrating the manner of detachably securing the upper removable track sections to the adjustable support standard.

Reference is now made more specifically to the accompanying drawings, wherein like numerals indicate similar parts throughout the various views, and wherein 10 indicates a portion of a towing or tractor truck which is coupled to a generally conventional type of automobile transporting trailer indicated at 12. As shown best in Figure 2, and indicated diagrammatically in Figures 1 and 3, the trailer 12 is provided with a car supporting floor having a pair of parallel preferably channel shaped members 14 constituting wheel tracks for receiving and supporting a lower layer of automobiles denoted by the reference character 16 in the drawings.

In accordance with conventional practice, the lower deck of the trailer is provided with an inclined ramp or loading track 18 whereby the cars 16 may be loaded upon the lower deck of the trailer, and in accordance with conventional practice, well portions 20 are provided intermediate the tracks 14, and upwardly inclined end portions 22 are provided therein for the purpose of inclining the cars in order to shorten their overall length and achieve more compact storage. As so far described, the trailer is conventional and of known design.

Rising from the forward and rearward ends of the trailer 12 and rigidly secured and reinforced in any desired manner, are pairs of fixed standards or supports 24 upon which are mounted at their upper ends suitably positioned track sections 26 preferably of channel cross section for receiving the wheels of the vehicles and provided with well portions for lowering the position of the vehicle or car upon the standard.

In accordance with the dictates of this invention, pairs of adjustable standards 28 are mounted intermediate the trailer and are suitably connected at their upper ends in pairs of the transverse reinforcing bars 30 and are provided with channel track sections 32. These intermediate standards 28 are arranged in laterally disposed pairs which are operated in unison and which are vertically adjustable for a purpose to be subsequently set forth. In order to permit easy loading of the cars upon the upper platform of the trailer, the track sections 26 and 32 are detachably connected by removable track sections 34 and by further removable sections 36 connecting the individually adjustable track section 32. As shown more clearly in Figure 5, the sectional tracks 26, and 32 are provided with suitable apertures or slots 38 with which are aligned elongated slots 40 formed in the adjacent end of the detachable sections 34 and 36. Any suitable retaining means such as the fastening pin 42 may be loosely inserted in the aligned slots or apertures 38 and 40 for the purpose of releasably retaining the removable sections upon the fixed section. From such suitable loading ramp provided as that indicated at 44 in Figure 1, a pair of automobiles may be loaded upon the upper track section as indicated in Figures 1 and 3, these cars being positioned reversely with respect to the lower pair of automobiles 16. When the upper pair of automobiles 46, have been loaded upon the upper supporting track, and suitably anchored thereon in accordance with customary practice, it will be noted that the rear wheels of the cars 46 are disposed with a minimum clearance above the hood portions of the lower cars 16.

The adjustable supports 28 are now lowered by a means to be now set forth, to properly incline the upper cars 46 and provide a minimum clearance between said cars and the lower automobiles 16. To achieve this purpose, the detachable track sections 34 and 36 are removed, thereby permitting the running boards and frame portions of the chassis of the cars 46 to approach more closely the uppermost portion of the body of the cars 16. In order to effect independent lowering of the front end of each of the cars 46, the standards 28 comprise piston rods or pistons (not shown) which are reciprocable in hydraulic cylinders 48 suitably mounted upon the lower framework of the trailer 12 adjacent the sides thereof and connected for simultaneous operation of a lateral pair of hydraulic cylinders by a suitable hydraulic conduit or pressure line 50 adapted for actuation by hydraulic operating means customarily associated with the tractor unit 10.

From the foregoing it is believed that the methods and apparatus for carrying out the concepts of this invention will be readily apparent and understood by those skilled in the art to which this pertains, and further description thereof is believed to be unnecessary.

While a method and apparatus for storing and positioning a second pair of automobiles above a first pair of cars carried by an automobile transporting trailer is not believed to be broadly new, yet the method and apparatus for so positioning a second pair of cars above a lower pair in a more compact assemblage by means of individually adjustable support members and detachable track sections is believed to present obvious advantages over the customary practice in this art and to represent a patentable invention as defined in the following claims.

What is claimed is:

1. In a trailer for transporting automobiles and having a fixed lower deck for supporting a first pair of automobiles, an upper deck for supporting a second pair of automobiles comprising supporting members at each end of said trailer and adjustable members positioned intermediate said supporting members, hydraulic jack means for vertically adjusting said intermediate members, and sections of track being removably attached to and interconnecting an intermediate member and a supporting member, said sections of track being removable to facilitate positioning the intermediate members and automobiles in subsequent lowered position.

2. In a trailer for transporting automobiles and having a fixed lower deck for supporting a first pair of automobiles, an upper deck for supporting a second pair of automobiles comprising supporting members secured to said fixed lower deck at each end of said trailer and adjustable members secured to said fixed lower deck intermediate said supporting members, hydraulic jack means for vertically adjusting said intermediate members, said intermediate members being disposed in pairs laterally of said trailer, said hydraulic jack means comprising simultaneously operable hydraulic jacks in each pair of laterally disposed intermediate members, and sections of track being removably attached to and interconnecting an intermediate member and a supporting member, said sections of track being removable to facilitate positioning the intermediate members and automobiles in subsequently lowered position.

JOSEPH A. BAKER.

REFERENCES CITED

The following references are of record in the file of this patent:

UNITED STATES PATENTS

| Number | Name | Date |
| --- | --- | --- |
| 1,809,557 | Lishon | June 9, 1931 |
| 1,887,325 | Pratt et al. | Nov. 8, 1932 |
| 1,894,534 | Dolan | Jan. 17, 1933 |
| 2,022,375 | Judd | Nov. 26, 1935 |
| 2,039,492 | Perkins et al. | May 5, 1936 |
| 2,146,567 | Dondlinger | Feb. 7, 1939 |
| 2,169,648 | Judd | Aug. 15, 1939 |